(12) United States Patent
Bhoi et al.

(10) Patent No.: US 8,728,195 B2
(45) Date of Patent: May 20, 2014

(54) GREEN PROCESS FOR THE PREPARATION OF DIRECT REDUCED IRON (DRI)

(75) Inventors: Bhagyadhar Bhoi, Orissa (IN); Barada Kanta Mishra, Orissa (IN); Raja Kishore Paramguru, Orissa (IN); Siddharth Kumar Pradhan, Orissa (IN); Partha Sarathi Mukherjee, Orissa (IN); Sambita Sahoo, Orissa (IN); Snigdha Priyadarshini, Orissa (IN); Priyanka Rajput, Orissa (IN); Subir Kumar Das, Orissa (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 13/584,122

(22) Filed: Aug. 13, 2012

(65) Prior Publication Data

US 2013/0047782 A1 Feb. 28, 2013

(30) Foreign Application Priority Data

Aug. 12, 2011 (IN) .............................. 2286/DEL/2011

(51) Int. Cl.
*C21B 13/12* (2006.01)
(52) U.S. Cl.
USPC .............................. 75/10.13; 75/10.22; 75/505

(58) Field of Classification Search
USPC ....................................... 75/10.13, 10.22, 505
See application file for complete search history.

(56) References Cited

U.S. PATENT DOCUMENTS

| 5,409,584 | A * | 4/1995 | Sackinger ...................... 204/164 |
| 7,229,485 | B2 * | 6/2007 | Tanner-Jones ................... 75/346 |
| 2009/0324440 | A1 * | 12/2009 | Marsh et al. ...................... 420/8 |
| 2012/0031232 | A1 * | 2/2012 | Huang et al. ................. 75/10.13 |

* cited by examiner

*Primary Examiner* — George Wyszomierski
*Assistant Examiner* — Tima M McGuthry Banks
(74) *Attorney, Agent, or Firm* — Knobbe, Martens, Olson & Bear, LLP

(57) ABSTRACT

Direct reduced iron (DRI) is obtained from iron ore by reduction using microwave assisted low temperature hydrogen plasma. The process includes steps of: (a) loading iron ore onto a sample holder (b) placing the sample holder inside a chamber followed by evacuating the chamber; (c) introducing hydrogen gas in the chamber at flow rate ranging between 100-500 standard cubic centimeters (sccm) followed by heating the sample holder and the iron ore at a temperature ranging between 300-800° C., a pressure ranging between 20-100 torr and a microwave power ranging between 500-1500 W to obtain direct reduced iron; and (d) cooling the direct reduced iron obtained in step (c) by flowing hydrogen at flow rate of about 300 sccm.

5 Claims, 3 Drawing Sheets

GREEN PROCESS FOR THE PREPARATION OF DIRECT REDUCED IRON (DRI)

FIELD OF THE INVENTION

The present invention relates to a green process for the preparation of direct reduced iron (DRI) from iron ore by reduction using microwave assisted low temperature hydrogen plasma. The reduction was carried out in a microwave plasma system. Iron ore particles are fully reduced in hydrogen plasma at 500 to 1500 W, 20 to 100 Torr and 300 to 800° C. using hydrogen gas at a flow rate of 100 to 500 sccm (standard cubic centimeter per minute). The product is analyzed after it was cooled to room temperature. The results clearly indicate that reduction of iron oxide in excess of 99% can be achieved by reducing the ore in hydrogen plasma.

BACKGROUND OF INVENTION

The conventional industrial blast furnace process of iron production from its oxides ($Fe_2O_3$ or $Fe_3O_4$) involves carbothermic reduction to produce molten pig iron and slag consisting of oxides like FeO, $SiO_2$, $Al_2O_3$, CaO, MgO, etc. The main chemical reaction that gives rise to molten iron can be described as $$Fe_2O_3 + 3CO \rightarrow 2Fe + 3CO_2$$

Preheated blast air blown into the furnace reacts with the carbon in the form of coke to produce carbon monoxide and heat. The carbon monoxide then reacts with the iron oxide to produce molten iron and carbon dioxide. Hot carbon dioxide, unreacted carbon monoxide, and nitrogen from the air pass up through the furnace as fresh feed material travels down into the reaction zone.

There are several environmental issues linked to blast furnace operation:
1. About 1.9 ton of $CO_2$ is produced per ton of crude steel.
2. Approximately 5% $CO_2$ in the atmosphere is due to steel industry.
3. Other gases such as $SO_x$ and $NO_x$ are produced during coke making and blast furnace operation.
4. Solid waste such as slag has to be treated and disposed economically.

The following table shows the theoretical production of CO and $CO_2$ in iron making for carbothermic reduction of hematite vis-a-vis production of water vapor in hydrogen reduction of hematite after considering the following reactions.

$$Fe_2O_3 + 3C \rightarrow 2Fe + 3CO \quad (i)$$

$$Fe_2O_3 + 1.5C \rightarrow 2Fe + 1.5CO_2 \quad (ii)$$

$$Fe_2O_3 + H_2 \rightarrow 2Fe + 3H_2O \quad (iii)$$

TABLE 1

Shows requirements of different reductants and their gaseous product for the production of one ton of metal.

| Reaction | Iron | C | $H_2$ | CO | $CO_2$ | $H_2O$ (in Ton) |
|---|---|---|---|---|---|---|
| (i) | 112 | 36 | | 84 | | |
| (ii) | 112 | 18 | | | 66 | |
| (ii) | 112 | | 6 | | | 54 |

The CO and $CO_2$ generation in commercial blast furnaces are higher than above figures. In addition to this, there are further generations of these gases in the coke oven plant while preparing coke for blast furnace. In contrast, it is quite clear that reduction by hydrogen only produces water which is environmentally benign. The process may be described as chimneyless process since there is no CO or $CO_2$ emission. The unreacted hydrogen in case of plasma process can be recycled after condensation and removal of water vapor.

Solid state direct reduction of iron ore using carbon in the form of non coking coal at temperatures below the melting point of iron, produces sponge iron or directly reduced iron (DRI), which is a spongy mass consisting of a mix of incandescent wrought iron and slag. The conventional DRI process is not environment friendly. It produces higher quantity of CO and $CO_2$ and the product normally consists of very high carbon content which is not desirable in the competitive market. The reducing gas is obtained by catalytic methane reforming in which coking and carbon formation on the catalyst and deactivations are the main disadvantage. It would be advantageous if a different process is conceived where methane gas and catalysts are completely eliminated.

The new technology proposed herein involves solid state extraction of carbon free iron from iron ore, using low temperature hydrogen plasma. Hydrogen plasma serves both as the heating source as well as the reductant. Hydrogen reduction of iron oxide being highly endothermic, plasma stage reduction is ideally suited compared to gas stage reduction. The chemical driving force, $\Delta G°$, for hydrogen atom as well as hydrogen ion (constituents of hydrogen plasma) with iron oxide is reported to be up to 3 and 15 times, respectively, lower than that involving molecular hydrogen and iron oxide. Thus the kinetics of reduction is expected to be faster by an order of magnitude in hydrogen plasma. For example, the rate of oxygen removal in smelting reduction of iron oxide by carbon at 1600° C. is 0.064 $g/cm^2 \cdot min$ where as it is about 0.53 $g/cm^2 \cdot min$ for hydrogen plasma smelting reduction.

The present invention opens up exciting possibilities as outlined below.
1) The size of the reactor/furnace shall be drastically reduced for a given throughput in case of continuous reactor.
2) Unlike conventional iron extraction process that includes multiple stages such as coke oven plant, pelletization/sintering, the plasma smelting would involve only one stage process.
3) Electric power consumption for plasma metallurgical furnaces can be high but as compared to conventional blast furnace the total energy consumption per ton of hot metal (HM) would be less in case of thermal plasma system. For example, the total energy consumption for iron oxide reduction works out to be 12.06 GJ/ton HM in case of hydrogen reduction process; where as it is 14.07 GJ/ton HM in blast furnace process. If energy spent in pelletization and sintering of ore fines and coke making are included, the total energy for molten metal making in BF process goes up to 19.49 GJ/ton HM but in the hydrogen reduction process it does not increase from 12.06 GJ/ton HM as preprocessing of ore is eliminated.
4) It eliminates the energy-intensive coke-making process. Flux mixing shall be very minimal to reduce impurities like P, S, Al, Si, etc. in the liquid metal by slag separation.
5) Since there is no involvement of coke, the product would be free from C and S which will improve product quality. Concentration of impurities like C, S, & Si, would be lower in comparison to the iron produced through conventional route.

6) In plasma condition, ore fines can be charged into the reactor.
7) The absence of effluents like $CO/CO_2$ would attract carbon credit.

DESCRIPTION OF PRIOR ART

A detailed analysis of the reduction of iron ore with hydrogen in a direct current plasma jet was carried out by Gilles and Clump (1970) [H. L. Gilles and C. W. Clump, *Ind. Eng. Chem. Process Dev.* 1970, 9, 194-207]. They showed that heat transfer to oxide particulates is a key factor determining the kinetics of the reduction process. Reduction of molten iron oxide and FeO bearing slags was reported by Kamiya et al. [K. Kamiya, N. Kitahara, I. Morinaka, K. Sakuraya, M. Ozawa and M. Tanaka, *Trans. ISIJ* 1984, 24, 7-16.] in 1984 who showed that rate of oxygen removal is very high (0.53 in $Fe_2O_3$, 0.27 in FeO slag) in smelting reduction by $H_2$—Ar plasma. Uchikoshi et al. [M. Uchikoshi, J. Imaizumi, H. Shibuya, T. Kékesi, K. Mimura and M. Isshiki, *Thin Solid Films* 2004, 461, 94-98] in 2004 carried out a process involving hydrogen reduction and plasma arc melting to produce high-purity semiconductor grade Fe with more than 99.99% in purity. H. Hiebler and J. F. Plaul [H. Hiebler and J. F. Plaul, *Metallurgija* 2004, 43, 155-162] in 2004, based on laboratory experiment, led to a large scale industrial plant concept which suggests that hydrogen plasma smelting reduction (HPSR) can be a good option for steel making with higher product quality and flexibility.

Several other workers such as Sjogren et al. [A. Sjogren and V. F. Buchwald, *JSTOR: Studies on Conservation* 1991, 36, 161-171] (hydrogen plasma reaction in iron meteorites) and Nakamura et al. [Y. Nakamura, M. Ito and H. Ishikawa, *Plasma Chem. Plasma. Process.* 1981, 1, 149-160.] (reduction and dephosphorization of molten iron oxide with hydrogen-argon plasma) have reported the various aspects and merits of reduction of iron oxide/ore in hydrogen plasma.

Reduction of iron oxide/ore by hydrogen was tried in the 1960's but owing to its slow reaction kinetics above 900° C., a complete reduction of iron oxide by hydrogen took about 3 days. Nobody thought of the fast reaction kinetics occurring in hydrogen plasma and its use in iron oxide reduction during these years because plasma sources were used for more strategic applications. Secondly, carbothermic reduction related $CO_2$ emission from steel plants during the last quarter of twentieth century was not so alarming as today to cause serious green house effect. Thirdly, suitable small and bench scale plasmatrons and reactors never used to be available earlier to investigate various aspects of hydrogen plasma reduction of iron ores and other minerals. As a result, till today, use of hydrogen plasma in iron and steel industry, is still in its infancy and mostly lab based concepts are being reported.

OBJECTIVES OF THE PRESENT INVENTION

The main objective of the present invention is to produce iron by direct reduction of iron ore using low temperature hydrogen plasma, thereby totally eliminating $CO/CO_2$ emission.

BRIEF SUMMARY OF THE INVENTION

Accordingly, the present invention provide a green process for the preparation of direct reduced iron (DRI) from iron ore by reduction using microwave assisted low temperature hydrogen plasma, wherein the said process comprising the steps of;
a. loading of iron ore onto the sample holder followed by evacuating of the chamber;
b. introducing the hydrogen gas in the chamber at flow rate ranging between 100-500 sccm followed by heating the holder and sample at temperature ranging between 300-800° C. and pressure ranging between 20-100 torr and at microwave power ranging between 500-1500 W to obtain direct reduced iron;
c. cooling the direct reduced iron as obtained in step (b) at temperature ranging between 300-800° C. by flowing hydrogen at flow rate of about 300 sccm.

In one embodiment of the present invention iron ore used in step (a) is hematite.

In another embodiment of the present invention iron ore used in step (a) is consisting at least % iron in the range of 61-64% Fe.

In yet another embodiment of the present invention reduction of iron ore is in the range of 60-99%.

In yet another embodiment of the present invention reduction of iron ore was carried out without using any carbonaceous materials to eliminate $CO_2$ emission.

DETAILED DESCRIPTION OF THE INVENTION

Blast furnaces have been used to reduce iron oxide to liquid iron. There are serious shortcomings with respect to blast furnace practice and most of it is about energy and environment. The present inventors have found that the application of microwave assisted plasma, allows reduction and/or metallisation of an ore (hematite) at a lower temperature and at a shorter residence time than is possible using the conventional processes. For these reasons, the process is energy efficient and environmentally friendly as no carbonaceous reductants and preheating processes are involved.

It is quite well known that plasma can be struck by subjecting a gas to a sufficient amount of microwave radiation at reduced pressure. Here a method is proposed to strike hydrogen plasma in a microwave plasma system. The reaction is engineered in solid state at 800° C. in vacuum at 100 Torr. Iron oxide in the hydrogen plasma atmosphere is reduced according to the following reaction which is conceived as an electrolytic reaction:
Partial Reactions:

Reduction by Atomic Hydrogen:

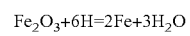

Reduction by Ionic Hydrogen:

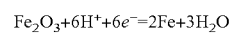

The reaction between $Fe_2O_3$ and $H/H^+$ goes into completion with 99% metallization. The product composition and characteristic consistent with this invention are provided.

The iron ore collected from Joda mines was crushed to minimum size of 25-30 mm. The pure hydrogen was used as reductant which reduces the iron ore in to iron.

The following examples are given by way of illustration of the working of the invention in actual practice and therefore should not be construed to limit the scope of present invention in any way.

Example 1

Figure 1:
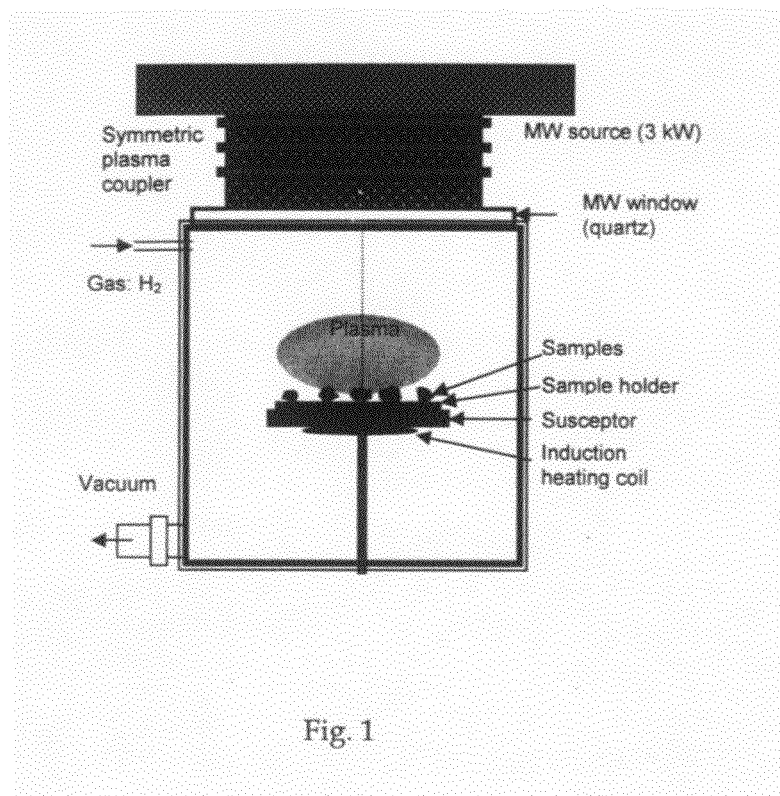
FIG. 1. Schematic of Microwave plasma reactor.

The reduction was carried out in a microwave plasma system. The schematic of the plasma system is shown in FIG. 1. The plasma gas used was pure hydrogen. A typical experimental campaign consisted of sample loading onto the molybdenum holder as shown in FIG. 1, evacuation of the chamber, introduction of hydrogen gas, heating of the holder and sample, and then maintaining of plasma at the required power level for predefined duration. The system pressure, temperature, hydrogen flow, and microwave power were increased sequentially to reach the final power settings of the experiment which was set as follows:
1. Pressure: 100 Torr
2. Temperature: 800° C.;
3. $H_2$ flow: 500 sccm
4. Power: 1.5 kW
5. Time: 35 min
6. Sample wt: 12.5717 g (Table 2)

TABLE 2 weight of the iron ore samples.

| Sample No | Wt. before reduction(g) | Wt. after reduction(g) |
|---|---|---|
| 1 | 2.4785 | 1.7343 |
| 2 | 3.2622 | 2.2694 |
| 3 | 2.0082 | 1.0771 |
| 4 | 2.7113 | 1.8979 |
| 5 | 2.1115 | 1.4028 |
| Total | 12.5717 | 8.3815 |

After completion of the plasma reduction process it was cooled to room temperature by flowing 80 sccm of hydrogen.

The microwave plasma system was used to generate the hydrogen plasma atmosphere in a highly controlled manner. The product thus obtained after plasma reduction in solid state was crushed, ground and analyzed for its chemical composition using wet chemical and x-ray diffraction techniques. Another sample was sectioned at the middle, mounted and polished for analysis using EDS, optical and scanning electron microscopy.

Table 3 shows the chemical composition of the product as determined by wet chemical analysis. It is observed that around 99% metallization is achieved.

TABLE 3

Product Assay.

| % | Assay in Wt. % | | |
|---|---|---|---|
| Metallization | Fe | Al | Si |
| After | 99.05 | 0.22 | 0.52 |

Figure 2:
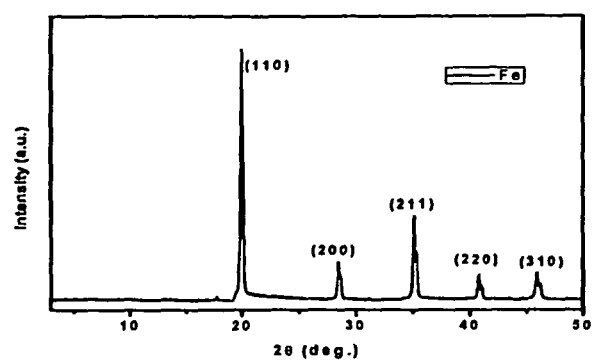
FIG. 2. XRD results of reduced product showing Fe peaks.

The result of the XRD is presented in FIG. 2 which clearly shows the presence of only iron peaks. No other peaks are visible as the weight percentage of iron is substantial compared to other elements such as Al and Si. Furthermore, peaks corresponding to oxides of iron is also absent.

Figure 3:
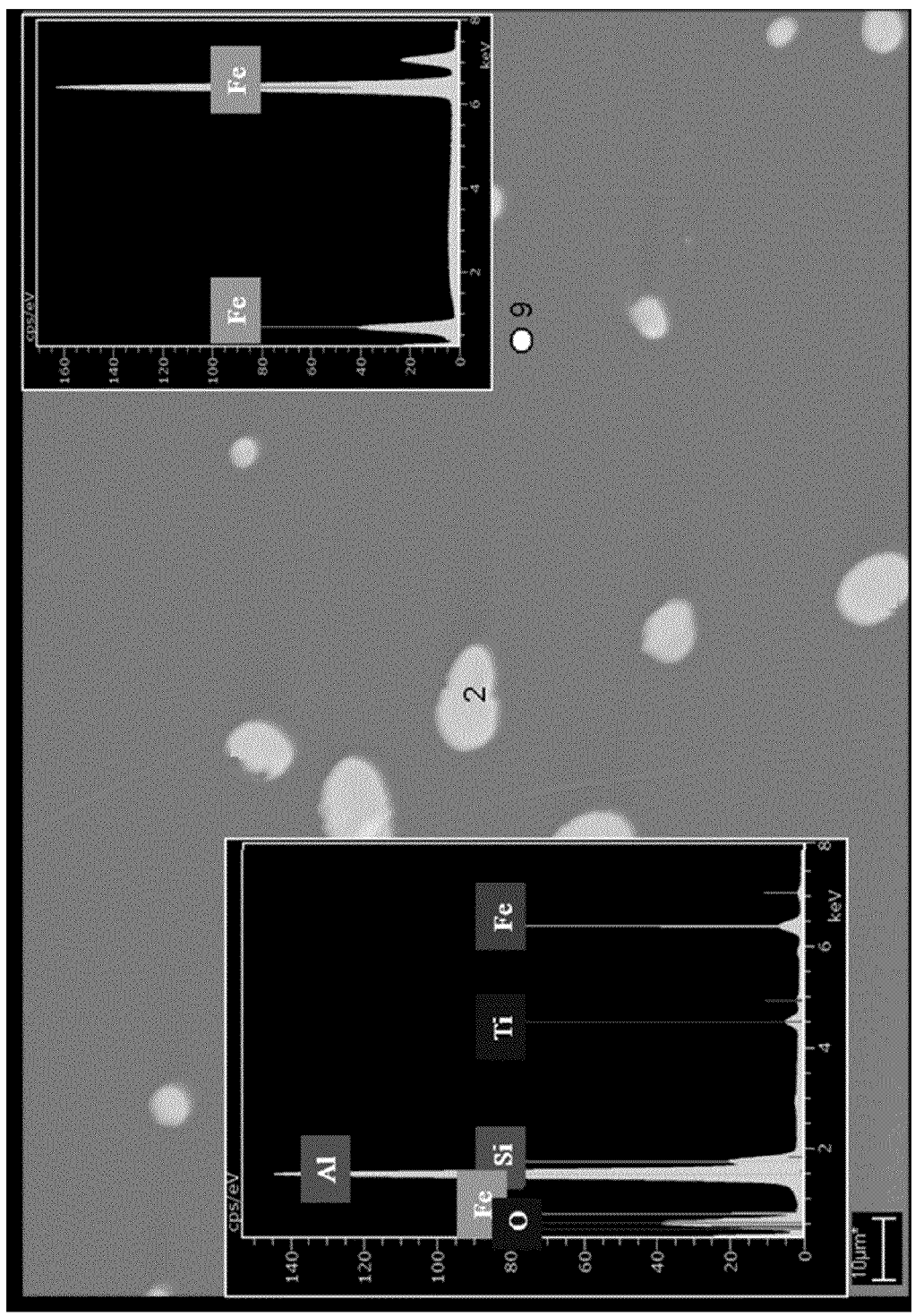
FIG. 3. Scanning electron micrograph of the DRI product showing globular oxide phase and iron metal phase as the matrix; Left-bottom insert is the EDAX result of the oxide phase and right-top insert is the EDAX pattern of the iron metal phase.

Finally the reduced sample was broken, mounted using epoxy base and subsequently polished for microscopic analysis. The Microstructure gives a clear indication of metallic iron which is the matrix (FIG. 3). Some amount of globular oxide phase is visible. The oxide phase in contrast to the iron matrix is detected from the EDAX pattern as shown in FIG. 3. The left-bottom insert is the EDAX pattern of the oxide phase and the right-top insert is the EDAX pattern of the iron metal phase. It is clear that the grayish areas which is the iron metal matrix is devoid of any contaminant where as the globular dark areas show presence of Si, Al, Fe, etc. The presence of oxygen indicates that the metallic elements are present in their oxide form.

Example 2

Direct reduced iron (DRI) was produced using iron ore lumps of size nearly 20 mm as the raw material. Pure hydrogen gas was used as plasmagen gas as well as the reductant. The hydrogen gas flow rate was 200 sccm, temperature was 300° C., the pressure was 50 torr, the microwave power was maintained at 750 W. The sample was cooled after the experiment with 300 sccm hydrogen flow rate. The reduced product thus obtained after plasma reduction in solid state was crushed, ground, and analysed for its chemical composition using wet chemical methods. The reduction of iron oxide was found to be 66%.

Example 3

Direct reduced iron (DRI) was produced using iron ore pellets having 40 mm diameter and 3 mm height as the raw material. Pure hydrogen gas was used as plasmagen gas as well as the reductant. The hydrogen gas flow rate was 200 sccm, temperature was 300° C., the pressure was 40 torr, the microwave power was maintained at 750 W. The sample was cooled after the experiment with 300 sccm hydrogen flow rate. The reduced product thus obtained after plasma reduction in solid state was crushed, ground, and analysed for its chemical composition using wet chemical methods. The reduction of iron oxide was found to be 90.64%.

Example 4

Direct reduced iron (DRI) was produced using iron ore pelts having 40 mm diameter and 3 mm height as the raw material. Pure hydrogen gas was used as plasmagen gas as well as the reductant. The hydrogen gas flow rate was 500 sccm, temperature was 800° C., the pressure was 100 torr, the microwave power was maintained at 750 W. The sample was cooled after the experiment with 300 sccm hydrogen flow rate. The reduced product thus obtained after plasma reduction in solid state was crushed, ground, and analysed for its chemical composition using wet chemical methods. The reduction of iron oxide was found to be 92.24%.

Advantages of Present Invention
1. A green process has been developed using microwave plasma for reduction of iron ore to produce DRI which is environment friendly.
2. The application of microwave assisted plasma allows reduction of iron ore at a lower surrounding temperature and at a shorter residence time than the conventional process.

3. The process is energy efficient and environment friendly as no carbonaceous reductant and pre heating processes are involved.
4. As there is no use of carbon as reductant in the process, the green house gases like carbon dioxide, carbon monoxide etc have been eliminated, thereby making the process pollution free and environment friendly.
5. Unlike conventional iron making processes that includes multiple stages such as coke oven plant, pelletization, sintering; microwave plasma system involves only one stage processes.
6. Since there is no involvement of coal the product is free from carbon and sulphur, which has improved the product quality. Concentration of impurities like carbon, sulphur and silicon would be lower in comparison to the iron produced through conventional process.
7. The size of the reactor or furnace will be drastically reduced for a given throughput in case of a continuous reactor.
8. The absence of effluents like $CO/CO_2$ would attract carbon credit.

What is claimed is:

1. A green process for preparation of direct reduced iron (DRI) from iron ore by reduction using microwave assisted low temperature hydrogen plasma, wherein the process comprises the steps of;

a. loading iron ore onto a sample holder;
 b. placing the sample holder inside a chamber followed by evacuating the chamber;
 c. introducing hydrogen gas in the chamber at flow rate ranging between 100-500 standard cubic centimeters per minute (sccm) followed by heating the sample holder and the iron ore at a temperature ranging between 300-800° C., a pressure ranging between 20-100 torr and a microwave power ranging between 500-1500 W to obtain direct reduced iron; and
 d. cooling the direct reduced iron obtained in step (c) by flowing hydrogen at a flow rate of about 300 sccm.

2. A process as claimed in claim 1, wherein iron ore used in step (a) is hematite.

3. A process as claimed in claim 2, wherein iron ore used in step (a) comprises 61-64 wt % Fe.

4. A process as claimed in claim 1, wherein reduction of iron ore is in the range of 60-99 wt %.

5. A process as claimed in claim 1, wherein reduction of iron ore is carried out without using any carbonaceous materials to eliminate $CO_2$ emission.

* * * * *